United States Patent
Bier et al.

(10) Patent No.: US 11,651,036 B2
(45) Date of Patent: May 16, 2023

(54) INTEGRATED INDEX BLOCKS AND SEARCHING IN BLOCKCHAIN SYSTEMS

(71) Applicant: Palo Alto Research Center Incorporated, Palo Alto, CA (US)

(72) Inventors: Eric Allan Bier, Palo Alto, CA (US); Shantanu Rane, Menlo Park, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 0 days.

(21) Appl. No.: 17/169,243

(22) Filed: Feb. 5, 2021

(65) Prior Publication Data

US 2021/0157859 A1 May 27, 2021

Related U.S. Application Data

(63) Continuation of application No. 16/144,861, filed on Sep. 27, 2018, now Pat. No. 10,929,473.

(51) Int. Cl.

| G06F 7/02 | (2006.01) |
|---|---|
| G06F 16/00 | (2019.01) |
| G06F 16/903 | (2019.01) |
| H04L 9/06 | (2006.01) |
| H04L 9/32 | (2006.01) |

(Continued)

(52) U.S. Cl.
CPC ........ G06F 16/90335 (2019.01); G06F 16/13 (2019.01); G06F 16/1805 (2019.01); G06F 16/1865 (2019.01); H04L 9/0637 (2013.01); H04L 9/32 (2013.01)

(58) Field of Classification Search
CPC .......... G06F 16/90335; G06F 16/1865; G06F 16/13; G06F 16/1805; H04L 9/0637; H04L 9/32
See application file for complete search history.

(56) References Cited

U.S. PATENT DOCUMENTS

| 2018/0349617 A1 | 12/2018 | Wang et al. |
| 2019/0042620 A1 | 2/2019 | Garagiola et al. |

(Continued)

OTHER PUBLICATIONS

Anadiotis, "Howto use blockchain to build a database solution", https://www.zdnet.com/article/blockchains-in-the-database-world-what-for-and-how/, ZDNet, Mar. 2, 2017, 11 pages.

(Continued)

*Primary Examiner* — Bruce M Moser
(74) *Attorney, Agent, or Firm* — Womble Bond Dickinson (US) LLP (57) ABSTRACT

Systems and methods for indexing blockchain data in a blockchain system. These systems and methods receive a set of transactions from one or more transaction blocks of a blockchain, wherein the transactions in the set have been validated by one or more peer systems of the blockchain. The systems and methods further generate an index to one or more fields of one or more transactions in the set of transactions of the transaction block generate an index representative of at least one field in the set of transactions of the transaction block and provide the generated index for validation by a peer system of the blockchain. After receiving verification from at least a threshold number of peer systems that the generated index has been validated by the peer system, the generated index is stored as an index block in the blockchain.

20 Claims, 7 Drawing Sheets

(51) Int. Cl.
  *G06F 16/13* (2019.01)
  *G06F 16/18* (2019.01)

(56) References Cited

U.S. PATENT DOCUMENTS

| | | | |
|---|---|---|---|
| 2019/0082007 | A1 | 3/2019 | Klarman et al. |
| 2019/0279247 | A1 | 9/2019 | Finken et al. |
| 2020/0043007 | A1 | 2/2020 | Simons |
| 2020/0204350 | A1* | 6/2020 | Kramer ................ G06Q 20/065 |
| 2020/0213125 | A1 | 7/2020 | Destefanis et al. |
| 2021/0073811 | A1* | 3/2021 | Chan ....................... G06F 21/64 |

OTHER PUBLICATIONS

Barger, "How to query ledger and historic data in Hyper-ledger Fabric", https://stackoverflow.com/questions/45008607/how-to-query-ledger-and-historic-data-in-hyper-ledger-fabric, Stack Overflow, 11 pages.
"BigchainDB 2.0 The Blockchain Database", BigchainDB, GmbH, Berlin, Germany, https://www.bigchaindb.com/whitepaper/bigchaindb-whitepaper.pdf, May 2018, Paper version 1.0, 14 pages.
Hyperledger Fabric FAQ, Hyperledger 2017, https://hyperledger-fabric.readthedocs.io/en/release-1.1/Fabric-FAQ.html, 1 page.
Hyperledger Fabric Model, Hyperledger 2017, https://hyperledger-fabric.readthedocs.io/en/release-1.1/fabric_model.html, 1 page.
Kochin, "Where do decentralized applications store their data?", https://github.com/TiesNetwork/ties-docs/wiki/Where-do-decentralized-applications-store-their-data%3F, GitHub, Sep. 1, 2017, 17 pages.
Parker, "Smartbit attempts the 'most in-depth Bitcoin search engine'", https://bravenewcoin.com/insights/smartbit-attempts-the-most-in-depth-bitcoin-search-engine, Brave Newcoin, Nov. 13, 2015, 4 pages.
Peyrott, "An introduction to Ethereum and Smart Contracts: a Programmable Blockchain", https://auth0.com/blog/an-introduction-to-ethereum-and-smart-contracts-part-2/, Mar. 28, 2017, 42 pages.
Sward, "Data Insertion in Bitcoin's Blockchain", Augustana College, Augustana Digital Commons, Computer Science: Faculty Scholarship & Creative Works, https://digitalcommons.augustana.edu/cgi/viewcontent.cgi?article=1000&context=cscfaculty, Jul. 2017, 19 pages.
Spagnuolo et al., "Bitlodine: Extracting Intelligence from the Bitcoin Network", FC2014: Financial Cryptography and Data Security, pp. 457-468.

* cited by examiner

*FIG. 7* ers of indexes to improve searching in block-
INTEGRATED INDEX BLOCKS AND SEARCHING IN BLOCKCHAIN SYSTEMS

CROSS-REFERENCE TO RELATED APPLICATION

This application is a continuation of U.S. patent application Ser. No. 16/144,861, filed Sep. 27, 2018, the entire contents of which are hereby incorporated by reference.

TECHNICAL FIELD

Implementations of the present disclosure relate to generation and user of indexes to improve searching in blockchain systems.

BACKGROUND

Blockchains provide a reliable, distributed, immutable, and persistent ledger of transactions. Currently popular blockchain applications, such as Bitcoin, Ethereum, and others, include information about each transaction including an associated buyer, seller, and transaction amount. However, due to the implementations of blockchain applications, these transactions can be difficult to search.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Various blockchain technologies can provide a verified, distributed, persistent, immutable store of transaction information or other information. As adoption increases, more applications are being built on top these blockchain technologies to take advantage of these features. For some of these applications, it is essential to be able to search the blockchain efficiently to find transactions that match a desired pattern. Finding a desired transaction in current blockchain technologies may require searching through the entire set of transactions, one at a time, requiring O(N) operations where N is the number of transactions in the entire blockchain. In addition, some blockchain technologies limit metadata about each transaction such that the desired information may not be present even if the correct transaction is found.

Because blockchains grow over time by their nature, the amount of time to complete a search will also increase over time. For those applications which require fast responses to queries, searching each transaction one at a time may require too much time and computation. To provide faster searching, blockchain systems may compute an index that is separate from the blockchain itself in order to facilitate searching. For example, a separate database and index may be setup for searching blockchain transactions that is separate from the blockchain. However, indexing the blockchain in a separate source means that the index does not have the benefit of the blockchain technology itself. In particular, the index is not verified, distributed, persistent, and immutable in the same way that the transactions are. Accordingly, different peers may compute different indexes, may have inconsistent search results compared to other peers, and systems may need to use CPU power to re-compute an index that is already available elsewhere.

Systems and methods described herein use index blocks within a blockchain to provide distributed, persistent, and immutable storage of a consistent index within the blockchain itself. The index block may be generated at intervals after a number of blocks or transactions have been stored in a blockchain. In some embodiments, the index block may be a separate type of block, but validated similar to other blocks within the chain. The index block may also be stored in an existing blockchain structure by using metadata in transactions to store the index over a series of transactions.

A blockchain system may compute index blocks for all or a portion of the blockchain. Thus, in some embodiments, a number of index blocks may be used together to quickly search a large portion of a blockchain. Because these blocks are stored on the blockchain, peer blockchain systems may verify the index. Some blockchain technologies use a distributed consensus algorithm in order to assure that all peers receive the same blockchain with the same blocks in the same order. These distributed consensus algorithms involve gossiping novel information through the network, selecting a leader to commit the new information, and gossiping the commitment through the network. The leader selection algorithms employ algorithms such as proof of work, proof of stake, proof of elapsed time, or the Stellar Consensus Protocol. Whichever algorithm is used, the peer chosen as the leader proposes that a new block be added at the end of the blockchain. If this proposal is accepted by one peer, it is accepted by all peers that are operating correctly, once the consensus algorithm operates. In addition, one or more hashes are computed based on the data in the block and these hashes are stored in the blockchain itself in order to ensure that the newly-added block is immutable; any changes to the block would be easily detected. Just as this has been done in previous blockchains for blocks of transactions, it is done in our approach for index blocks. Distributed consensus ensures that the index block is added at the same location in all peers. Stored hashes ensure that the index block cannot be changed. Reference herein to distributed consensus algorithms may refer to proof of work, proof of stake, the Stellar Consensus protocol, or other consensus algorithms.

In some embodiments, transactions may be formatted with particular fields that are intended to be searchable. For example, in the sale of unique items, such as real estate, vehicles, firearms, or the like, the commodity being sold can be identified by a unique value such as an address, a VIN, or a serial number. These may be indexed in one or more index blocks. In some embodiments, a single blockchain may include different types of transactions. To further increase search speed, in some embodiments, separate indexes or index blocks may be generated for different types of transactions. For example, one index may be created for vehicles and another for real estate. In some embodiments, this may provide different keys for the index and additional compression possibilities when storing index blocks to the blockchain.

It should be noted that although some of the embodiments and examples provided herein are described with respect to real-estate transactions for convenience, the methods and systems described herein are not limited to any particular type of transaction or data. The methods and systems described herein may be used to store any type of data on any type of blockchain and to do so more efficiently.

Figure 1:
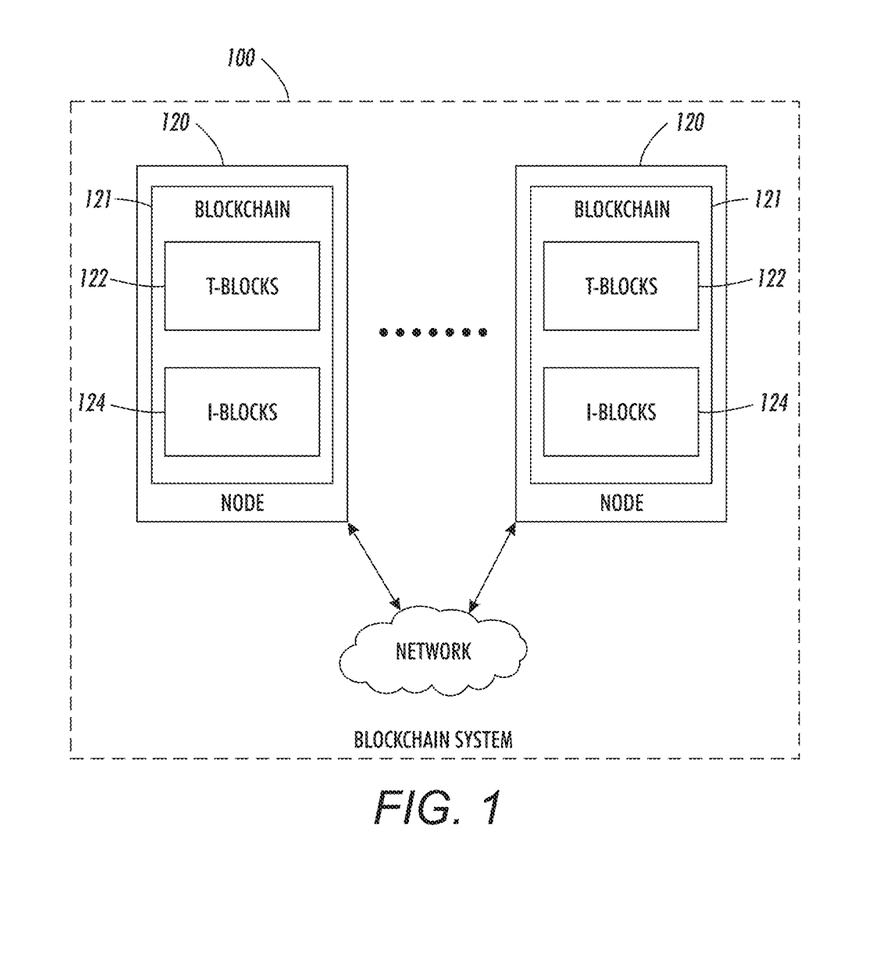
FIG. 1 is a block diagram illustrating a blockchain system, in accordance with some embodiments.

FIG. 1 is a block diagram illustrating a blockchain system 100, in accordance with some embodiments. Although specific components are disclosed in blockchain system 100, it should be appreciated that such components are examples. That is, embodiments of the present invention are well suited to having various other components or variations of the components recited in blockchain system 100. It is appreciated that the components in blockchain system 100 may operate with components other than those presented, and that not all of the components of blockchain system 100 may be required to achieve the goals of blockchain system 100.

Blockchain system 100 may be a decentralized, peer-to-peer networking system. Without a central authority, operations (e.g., transactions) of blockchain system 100 may be managed collectively by nodes 120 in the system. Transactions may occur directly between users and stored on the blockchain 121 in transaction blocks 122. In some embodiments, certain nodes 120 may include only a portion of blockchain 121 rather than a complete copy of the blockchain 121.

In FIG. 1, blockchain system 100 is a decentralized database. The blockchain 121 may include transaction blocks 122 and index blocks 124. The transaction blocks 122 may include a variety of components, including blockchain headers, transactions, hashes of previous block headers, Merkle Roots, and/or the like. For example, each transaction block 122 contains a record of recent transactions and a header, including a reference to the block that came before it and the solution to a complex mathematical puzzle among other data (e.g., a timestamp).

In some embodiments, a blockchain 121 is collectively maintained by "miners," who are members within the network that compete to validate blockchain transactions in each block by solving a complex mathematical problem associated with the block. These miners may be incentivized to complete a distributed consensus algorithm to validate blockchain transactions by rewarding them with some amount of monetary compensation upon successful completion. In some embodiments, the blockchain 121 is maintained by nodes 120 that validate transactions without compensation or distributed consensus algorithm requirements. For example, trusted parties interested in an immutable record of transactions may maintain and use a blockchain system 100 without distributed consensus algorithm requirements.

The blockchain 121 also includes index blocks 124 that provide an index for searching transactions stored in transaction blocks 122. In some embodiments, the index blocks may provide an index of the entire blockchain. The index blocks 124 may also be generated for a set number of preceding transaction blocks 122. For example, the index blocks 124 may be generated at regular intervals of a set number of transactions, blocks, or predetermined times. In some embodiments, parties may similarly be incentivized to compute indexes, validate indexes, and generate hashes for indexes as with the generation of transaction blocks.

Figure 2:
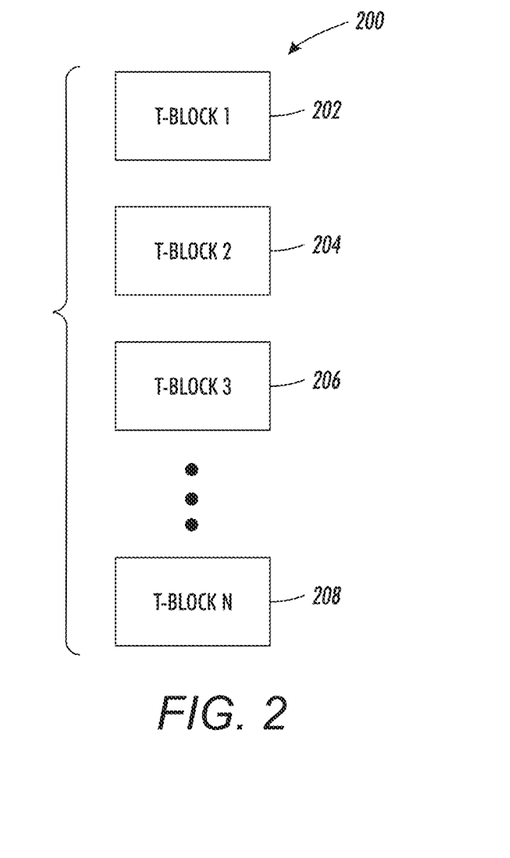
FIG. 2 is a block diagram illustrating blockchain transaction blocks, in accordance with some embodiments.

FIG. 2 is a block diagram illustrating blockchain 200 transaction blocks 202-208, in accordance with some embodiments. In one embodiment, each of the transaction blocks (T-blocks) 202-208 may contain transaction data. As illustrated, the blockchain 200 is a sequence of T-blocks 202-208. Each T-block 202-208 in the blockchain 200, may consist of a list of transactions. Each transaction may then contain a list of data fields that describe that particular transaction. In some embodiments, the transactions may be stored with metadata other than fields to describe the transactions. For example, structured text may be used to store metadata associated with a transaction.

Figure 3:
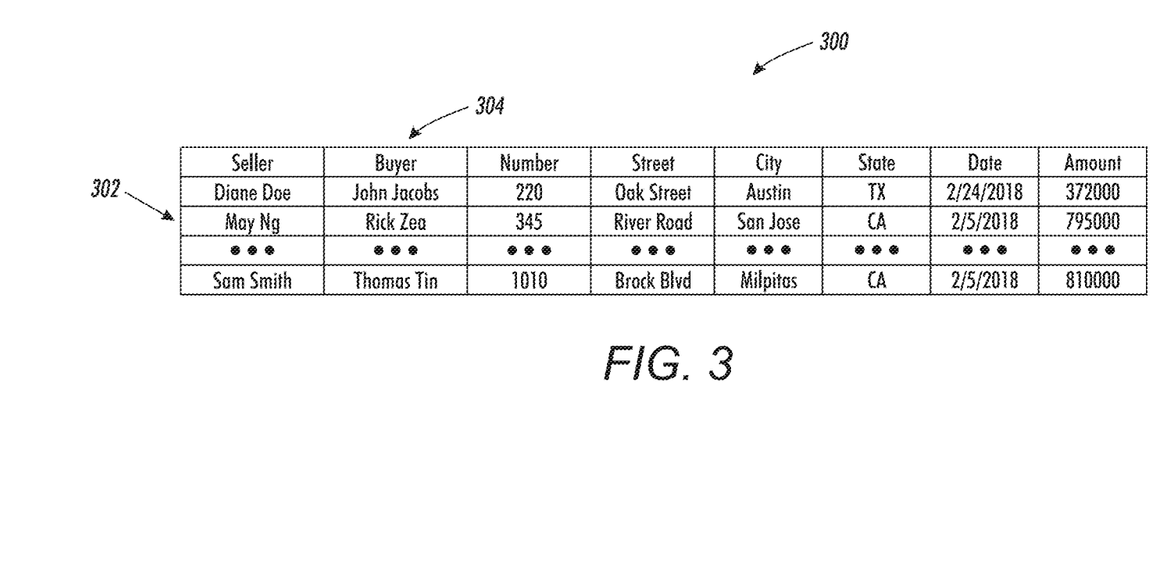
FIG. 3 is a block diagram illustrating data of an example transaction block, in accordance with some embodiments.

FIG. 3 is a block diagram illustrating data of an example transaction block 300, in accordance with some embodiments. For example, the transaction block 300 may be similar or the same as a transaction block as shown with reference to FIG. 2 above. As described above, transaction block 300 may represent a data view of a transaction block. Each row 302 of the transaction block 300 represents a transaction and each column (e.g., "Buyer" 304) represents one field of data pertaining to that transaction. In this example, all of the transactions are real estate sales. In other examples, any other type of transaction may be used. Furthermore, in some embodiments, unformatted text may be used instead of fields. For example, structured text such as XML may be used to represent the index.

In one embodiment, the transaction blocks of FIGS. 2 and 3 require a significant amount of data for each transaction. As the blockchain grows, it becomes more cumbersome to search through each transaction in the blockchain. For example, the last row of FIG. 3 includes roughly 60 characters, even though the names of people and streets are relatively short. If each character requires 16 bits, as is the case in Unicode, it would take 120 bytes to represent this row, plus additional space to encode field boundaries, a unique ID for the transaction and so on. Furthermore, as the number of transactions stored in the blockchain grows, the number of rows that need to be searched grows as well. Accordingly, searching through all of the transactions in the blockchain requires too much time and computation.

Advantageously, using the indexing technique described herein, the performance of searching for transaction blocks may be greatly increased by providing an index within the blockchain as described below. In some embodiments, the index may be computed and stored as a separate block within the blockchain. In some embodiments, the index may be stored as metadata for a set of transactions and stored within a transaction block. Advantageously, these indexes acquire the same characteristics of persistence, immutability, and reliability that the blockchain provides for the data being searched.

Figure 4:
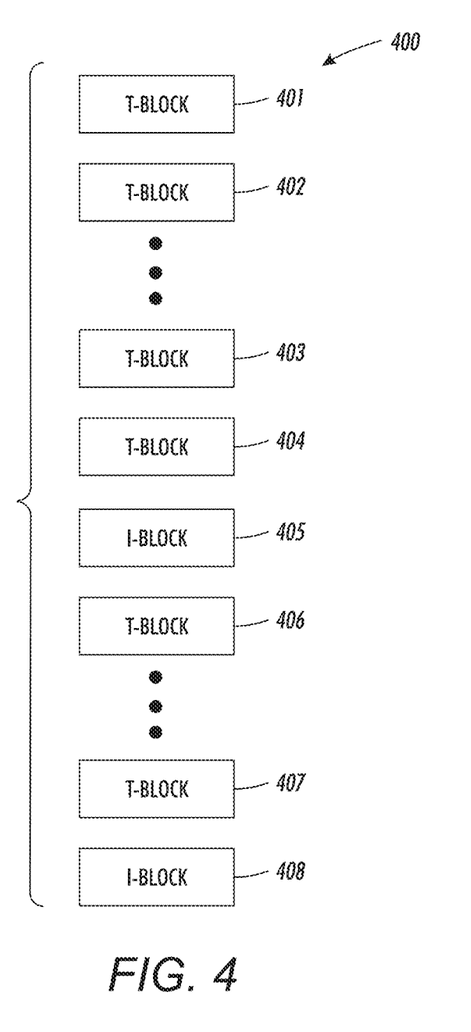
FIG. 4 is a block diagram illustrating blockchain transaction blocks and index blocks, in accordance with some embodiments.

FIG. 4 is a block diagram illustrating blockchain 400 with transaction blocks 401, 402, 403, 404, 406, 407 and index blocks 405, 408, in accordance with some embodiments. As shown, index blocks 405, 408 may be added to the blockchain 400 without disrupting the addition of transaction blocks 401, 402, 403, 404, 406, 407 to the same blockchain 400. Each index block 405, 408 contains one or more indexes over the set of transactions. Each index may contain some or all of the transactions in the transaction blocks 401, 402, 403, 404, 406, 407 since the last index block 405, 408.

For example, index block 405 may store and index including transactions 401-404 and index block 408 may store an index of later transactions. Each index may be organized around a different key or keys. For example, in a blockchain that contains both real estate sales and automotive sales, a given index might represent only the real estate transactions and might use the street address of the property as the primary key. As shown, an index block 405, 408, may be created after a set number of transaction blocks. For example, an index block 405, 408 may be created for each sequence of transaction blocks of length 10, 100, or some other number of blocks, after variable-sized sequences of transaction blocks, or at set periods of time.

Figure 5:
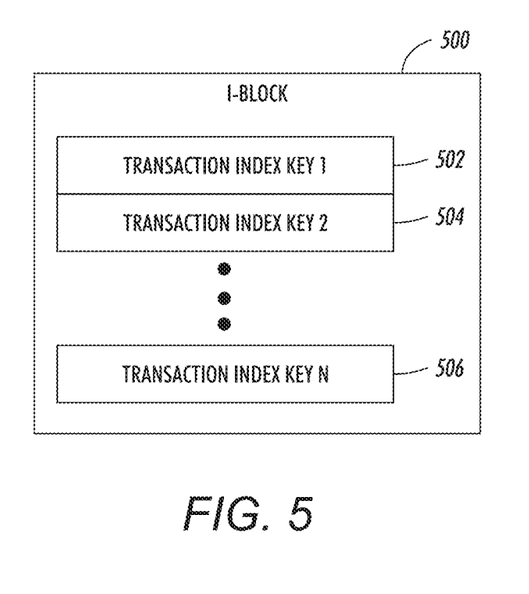
FIG. 5 is a block diagram illustrating an example structure of a blockchain index block, in accordance with some embodiments.

FIG. 5 is a block diagram illustrating an example structure of an index block 500, in accordance with some embodiments. In some embodiments, each index block 500 can include a number of indexes 502, 504, 506 that index different types of transactions. For example, a first index may be created for vehicles, a second for real-estate, and a third for miscellaneous transactions. In some embodiments, there may be a single index key for the index block 500. Additionally, there may be any number of index keys for a set of transactions.

In various embodiments, different indexing schemes may be used to generate indexes for the index blocks 500. For example, in some embodiments, the blockchain stores enough structured data about each transaction so that it is possible to support desired applications. For example, structured data may support applications where it is possible to track the history of a given asset, buyer, seller, asset type, or the like. Additionally, the size of an index block should be kept reasonable in comparison to the total size of the blockchain. Use of the indexes for searching should reduce the number of blocks that need to be inspected when a search is run. Searching with the indexes may provide results from blocks added long ago, from recently-added blocks, and from transactions that have not yet been stored in a block. Furthermore, searching the index should run more efficiently, on average, than would be the case if the blockchain system were to search one by one through the transactions on the blockchain without using an index. The index should also load quickly from the blockchain and the accuracy and completeness of each index should be verified by peer systems.

In some embodiments, a node may generate the index block 500 for a given a particular set of fields in all transactions of a given type to be indexed at periodic intervals as a blockchain grows. Each time an index is computed for that set of fields, it is computed over all transactions of that given type that are currently in the blockchain. The index can then be validated and stored as an index block in the blockchain. This may improve the search process because it is only necessary to review the most recent index of this type in order to search the entire blockchain for transactions of the given type. However, such an index takes more computation resources to generate than an index over a subset of the transactions and grows proportionally to the size of the blockchain itself.

In some embodiments, a node may generate the index block 500 over set range of blocks. For example, the index block may contain only the most recent set of blocks that haven't yet been added to an index. For example, a node may generate an index after every 100 blocks that includes only the transactions from those 100 blocks. In order to search the entire blockchain, a node performing a search will need to review multiple indexes of this kind, one for each sequence of 100 blocks.

In some embodiments, a node may generate the index block 500 using a restrictive filter. For example, the index block may include an index of all transactions that are in confirmed blocks and involve the sale of a house in Wyoming in the years 2000 through 2009. So long as the set of transactions matching the filter is small enough, the index will be of a reasonable size. So long as the search query is restricted to house sales in Wyoming during those years and so long as no new transactions about such sales are added to the blockchain after the index is computed, the query can be performed efficiently using that index alone.

In addition to not impacting the size of the blockchain as a whole, an index scheme improves the number of blockchain blocks that need to be opened and examined to perform a query. In some embodiments, an index may not include all of the fields needed to generate search results. In such cases, the index may be used to identify potential blocks to examine and then individual transactions are found in the identified blocks.

In some embodiments, for some queries, loading all of the index blocks may be unnecessary. For example, if a given Index block covers only transactions from the years 1996-1997 and the query is for transactions from years 2000 to 2005, the query may be completed without the use of that particular index block. In order to support this kind of selective use of index blocks, metadata indicating time, types of transactions, or the like may be added to each of the index blocks. For example, each index block may include a header that specifies the minimum and maximum value of its fields. Thus, an example index block header would specify 1996 as the minimum value of its transaction year field and 1997 as the maximum value of that field.

In some embodiments, when a node generates an index block, it includes only transactions that occur in previous blocks in the blockchain. This may be true for complete indexes, partial indexes, or indexes based on restrictive filtering. New transactions that are part of a non-indexed block, or not yet recorded into a block, may not show up in a search of the indexes. Furthermore, forks in the blockchain may require separate indexes as they grow. Once a new index block is added to the blockchain, regular transaction blocks are added after that index block. Because the index block does not include the transactions from these newer blocks, additional steps may be taken to ensure they are included in search results. Likewise, to include unconfirmed transactions in our search results, those transactions are searched without relying on the index blocks.

In some embodiments, in order to simplify the search process, the blockchain system may begin by loading all of the indexes that are relevant to the current query from the entire blockchain and merge them into a single index. The most recent blocks and transactions can then be added to this single index, which is computed by a single node and need not be added to the blockchain. The resulting set of transactions responsive to the query may then be returned in response to a search in the single index. In some embodiments, search performance will depend on the type of index used, the choice of index key, whether or not the single index includes all of the fields of the result, and whether a single monolithic index is used or the query is distributed to multiple smaller indexes.

Regarding index type, as with any relational database, the speed of queries will depend on the type of index used. If the index is a hash table, results are expected in roughly $O(k)$, where k is the number of transactions in the result set. If the index is a B-tree or a sorted index, results may be expected in $O(\log N+k)$ time where N is the total number of transactions in the index. The index will operate most efficiently if the key is compatible with the query. For example, if we wish to find all transactions pertaining to a given piece of real estate, the data should be indexed on a unique identifier of the property, such as Number, Street Name, City, and State. To efficiently search for all transactions involving a given property owner, a second index, keyed to the unique identifier of each property owner may be used. In general, a separate index is needed for each kind of entity that will be searched.

If the index contains all of the data fields of each transaction needed in the query results, then access to the transaction blocks of the blockchain is not required to answer the query; we only require access to the index. In this case the index is a covering index for the query. If some fields of the query are not present in the index, then performing the query involves accessing some of the transaction blocks of the blockchain. In particular, completing the query includes accessing those transaction blocks that contain transactions that are in the result set and searching within those blocks until all of the matching transactions are found.

In some embodiments, the index may be in a single location or in multiple locations. If the index is in multiple locations, copies or portions may be on the same peer system or on different peer systems. For example, in a monolithic index the index is a single shard on a single peer. Accordingly, processing a query is performed as a single lookup on that index, making search simple and relatively fast. However, this requires computing the monolithic index, which may be a significant computation on a large blockchain, and requires the use of a processing device on a single peer to perform the search. In some embodiments, multiple shards may be present on one peer system. For example, one shard from each index block that supports a given index may be stored on a peer system. Search is then performed by running the query against all of the shards, taking the results from each shard, and combining them into a single result set. This design does not require computing and maintaining a monolithic index and allows some shards to be ignored if they cannot contain any transactions of interest. However, a multiple shard implementation adds extra steps to distribute the query to the multiple shards and then to combine the result sets. In some embodiments, the shards of a given index are available on multiple peer machines. Accordingly the search query may be distributed and performed at multiple machines, where each machine runs the query against a different set of shards. The results are forwarded to the requesting peer, so they can be combined and returned as a single query result. This approach may reduce latency and improve throughput.

In some embodiments, each index block is available to all of the peer systems that share that blockchain. Therefore, the indexes may be optimized to load rapidly into each of the peer systems. For example, if the index is a sorted table, B-tree, or hash table, tables may be organized and serialized into the block, so that it can later be loaded sequentially into the memory of the peer systems in time proportional to the size of the index O(k) for an index of k transactions, without any further sorting, B-tree operations, hashing, or other data structure manipulations. In some embodiments, a monolithic index may be stored locally on each peer such that each shard of the index, corresponding to a single index block, can be merged rapidly into this monolithic index. While a naive merging algorithm will take O(M+k) time where M is the current size of the index and k is the size of the shard being merged into it, if we know the structure of the index and of the shard, better performance may be provided. For example, if an index begins with a primary sort on transaction date, and if the index computed so far includes only transactions occurring before July 2017 a new shard includes only transactions from July 2017, and the index is a sorted index, merging in the new shard may be accomplished by appending its transactions, in time O(k) instead of O(M+k). In this case, the entire monolithic index may be built in time O(N) where N is the total number of transactions across all of the index blocks.

In some embodiments, the index blocks that are written into the blockchain will be used, for some purposes, in place of the data in the blockchain. For example, if any index contains all of the fields of a transaction that are needed to answer a query, the peer systems may use that index to answer the query in place of digging the original data out of the blockchain. As a result, it is important to ensure that the index is computed accurately just as it is important that the transactions in the traditional blockchain are recorded accurately. To ensure validation, a similar mechanism can be used to verify an index that is used to verify transactions. Like any other block, an index is not added to the blockchain until it has been verified by an appropriate collection of peer systems. Each index block may be verified in several ways. First, each peer system that is involved in verification can run the indexing algorithm over the transaction set that is being indexed. All of the peer systems can verify that they get the same result. In addition, individual peer systems can run test queries against the index and compare the results to the results that would be found by accessing the blockchain directly. This second method of verification can find both errors introduced by a dishonest peer and errors introduced by flaws in the indexing algorithm itself.

Figure 6:
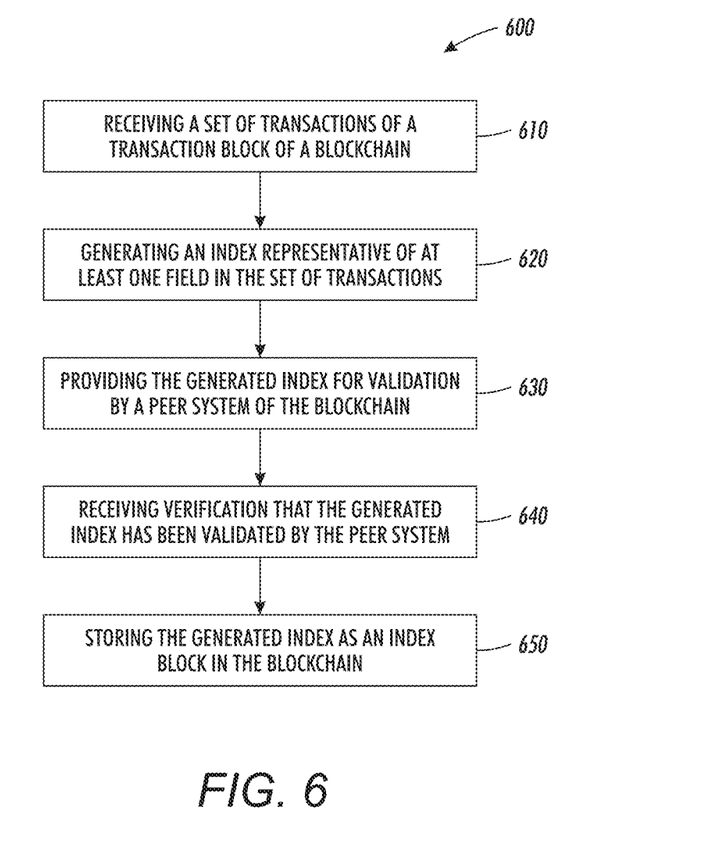
FIG. 6 is a graphical flow diagram illustrating a method of reducing storage of blockchain metadata via dictionary-style compression, in accordance with some embodiments.

FIG. 6 is a graphical flow diagram illustrating a method of indexing and searching blockchain metadata via index blocks, in accordance with some embodiments. For example, the processes described with reference to FIG. 6 may be performed by the processing logic of a blockchain system, as described herein. Beginning in block 610, a blockchain system receives a set of transactions of a transaction block of a blockchain. In some embodiments, the transactions have been validated by a threshold number of peer systems of the blockchain system before being set as a block. In some embodiments, a plurality of transaction sets from a number of transaction blocks may be received at one time for indexing.

Moving on to block 620, the blockchain system generates an index based on one or more fields of one or more transactions in the transaction set. In various embodiments, different indexing schemes may be used. An indexing scheme may be set based on the type of transactions, number of fields indexed, frequency or types of searches that are expected, available space in the blockchain, or other factors. In some embodiments, multiple peer systems may simultaneously compute an index for the set of transactions. These may then be compared.

In block 630, the blockchain system provides the generated index for validation by a peer system of the blockchain. For example, a peer node in the system may broadcast the generated index to all of the peer nodes attached to the blockchain system. In some embodiments, only a subset of nodes may be provided the generated index for validation. For example, peer systems may be selected in a round robin fashion for validation or another set of characteristics indicating that a peer system is to receive the generated index. If the index is properly generated, the blockchain system may in block 640 receive verification from at least a threshold number of peer systems that the generated index has been validated by the peer system. In some embodiments, this may be all peer systems, or a subset that is sufficient to satisfy a threshold. After the index is verified, the blockchain system, in block 650 stores the generated index as an index block in the blockchain. The index block will include one or more indexes that enable rapid search for transactions. Each index is based on a key consisting of a single field or a combination of fields. Such an index will support queries on the transactions over the fields specified in the key. Each index may also include additional metadata fields that are not included in the key, but are desired as part of the information returned as the result of the query. For example, a real estate query may search for the combination of house number, street name, city and state and then return information about the date of sale, the buyer, and the seller. If the date of sale, the buyer, and the seller are included in the index, these values can be returned immediately, without the need to retrieve this information from the associated transaction blocks.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 7:
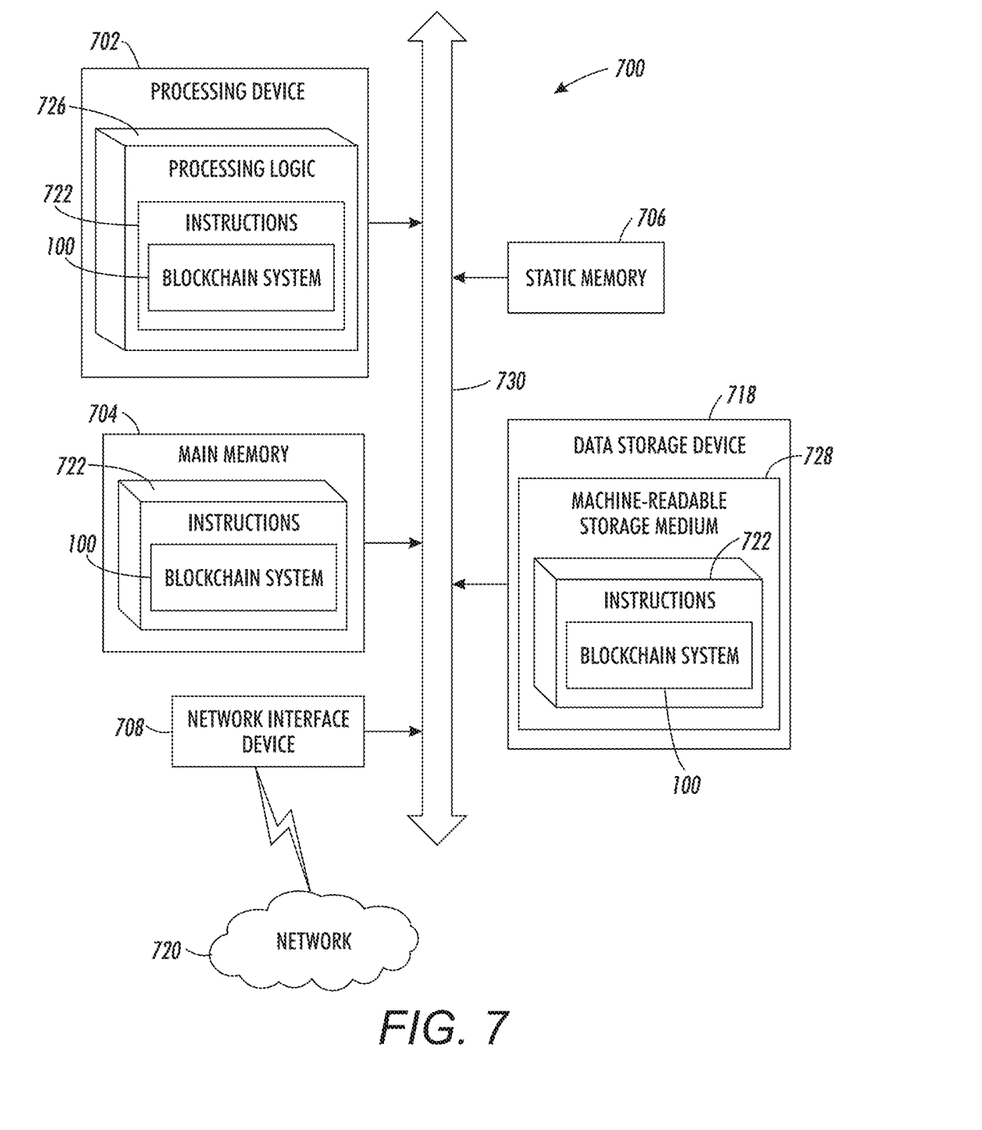
FIG. 7 is an illustration showing an example computing device which may implement the embodiments described herein.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server computer system, such as a blockchain system as described herein.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be a complex instruction set computer (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), a network processor, or the like. The processing device 702 is configured to execute processing logic 726, which may be one example of a blockchain system 100 for performing the operations and steps discussed herein.

The data storage device 718 may include a machine-readable storage medium 728, on which is stored one or more sets of instructions 722 (e.g., software) embodying any one or more of the methodologies of functions described herein, including instructions to cause the processing device 702 to execute blockchain system 100. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform the methods and operations described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method comprising:
receiving a set of transactions of a transaction block of a blockchain, wherein the set of transactions have been validated by one or more peer systems of the blockchain;
generating, by a processing device, an index to one or more fields of one or more transactions of the transaction block;
providing the generated index for validation by a peer system of the blockchain;
receiving verification from at least a threshold number of peer systems that the generated index has been validated by the peer system; and
storing, by the processing device, the generated index as an index block in the blockchain, wherein the index is serialized into the index block for rapid loading.

2. The method of claim 1, wherein the generated index is representative of a first subset of the set of transactions, wherein the method further comprises generating a second index representative of a second subset of the set of transactions.

3. The method of claim 1 further comprising generating a reward.

4. The method of claim 1, further comprising adding the index block to the blockchain and storing a hash of the index block in the blockchain to preserve its immutability.

5. The method of claim 1, further comprising:
receiving a query based on a field that is present in one or more transactions stored in the blockchain; and
searching for transactions in which the field has the specified value or values, by searching in the index block of the blockchain.

6. The method of claim 5, further comprising:
identifying a responsive transaction block associated with the index block that satisfies the query based on a field; and
searching the transactions within the responsive transaction block for transactions satisfying the query.

7. The method of claim 1, further comprising:
receiving, from a second peer system, a proposed index block of a second set of transactions of a second block of the blockchain;
determining that the proposed index block is a complete and consistent index of the second set of transactions; and
providing an indication to the second peer system that the proposed index block has been validated.

8. The method of claim 7, further comprising generating a hash of the proposed index block provided by the second peer system.

9. The method of claim 1, wherein generating the index further comprises
generating an index for a first subset of fields in the transactions of the block; and
generating the index block without an index for a second subset of fields in the transactions of the block.

10. A blockchain system comprising:
a memory; and
a processing device, operatively coupled to the memory, to:
receive a set of transactions of a transaction block of a blockchain, wherein the set of transactions have been validated by one or more peer systems of the blockchain;
generate, an index to one or more fields of one or more transactions in the set of transactions of the transaction block;
provide the generated index for validation by a peer system of the blockchain;
receive verification from at least a threshold number of peer systems that the generated index has been validated by the peer system; and
store the generated index as an index block in the blockchain, wherein the index is serialized into the index block for rapid loading.

11. The blockchain system of claim 10, wherein the generated index is representative of a first subset of the set of transactions, wherein the method further comprises generating a second index representative of a second subset of the set of transactions.

12. The blockchain system of claim 10, wherein the processor is further to use a distributed consensus algorithm to add the index block to the blockchain and storing a hash of the index block in the blockchain to preserve its immutability.

13. The blockchain system of claim 10, wherein the processor is further to:
receive a query based on a field that is present in one or more transactions stored in the blockchain, wherein the query specifies a value or values of the field; and
search for transactions in which the field has the specified value or values, by searching in the index block of the blockchain.

14. The blockchain system of claim 13, wherein the processor is further to:
identify a responsive transaction block associated with the index block that satisfies the query for the field; and
search the transactions within the responsive transaction block for transactions satisfying the query.

15. The blockchain system of claim 10, wherein the processor is further to:
receive, from a second peer system, a proposed index block of a second set of transaction of a second block of the blockchain;
determine that the proposed index block is a complete and consistent index of the second set of transactions; and
provide an indication to the second peer system that the proposed index block has been validated.

16. The blockchain system of claim 10, wherein the processor is further to generating a reward.

17. A non-transitory computer-readable storage medium having instructions stored thereon that, when executed by a processing device, cause the processing device to:
receive a set of transactions of a transaction block of a blockchain, wherein the set of transactions have been validated by one or more peer systems of the blockchain;
generate, an index to one or more fields of one or more transactions in the set of transactions of the transaction block;
provide the generated index for validation by a peer system of the blockchain;
receive verification from at least a threshold number of peer systems that the generated index has been validated by the peer system; and
store, the generated index as an index block in the blockchain, wherein the index is serialized into the index block for rapid loading.

18. The non-transitory computer-readable storage medium of claim 17, wherein the processing device is further to:
receive a query based on a field that is present in one or more transactions stored in the blockchain, wherein the query specifies a value or values of the field; and
search for transactions in which the field has the specified value or values, by searching in the index block of the blockchain.

19. The non-transitory computer-readable storage medium of claim 17, wherein the processor is further to:
identify a responsive transaction block associated with the index block that satisfies the query for the field; and
search the transactions within the responsive transaction block for transactions satisfying the query.

20. The non-transitory computer-readable storage medium system of claim 17, wherein the processor is further to:
receive, from a second peer system, a proposed index block of a second set of transaction of a second block of the blockchain;
determine that the proposed index block is a complete and consistent index of the second set of transactions; and
provide an indication to the second peer system that the proposed index block has been validated.

* * * * *